R. G. MILLER.
ANIMAL TETHER FOR VEHICLES.
APPLICATION FILED AUG. 9, 1915.

1,187,080.

Patented June 13, 1916.
2 SHEETS—SHEET 1.

WITNESSES:
Fred Roeger
Dorothy Miatt

INVENTOR
Ralph G. Miller
BY
Geo. Wm. Miatt
ATTORNEY

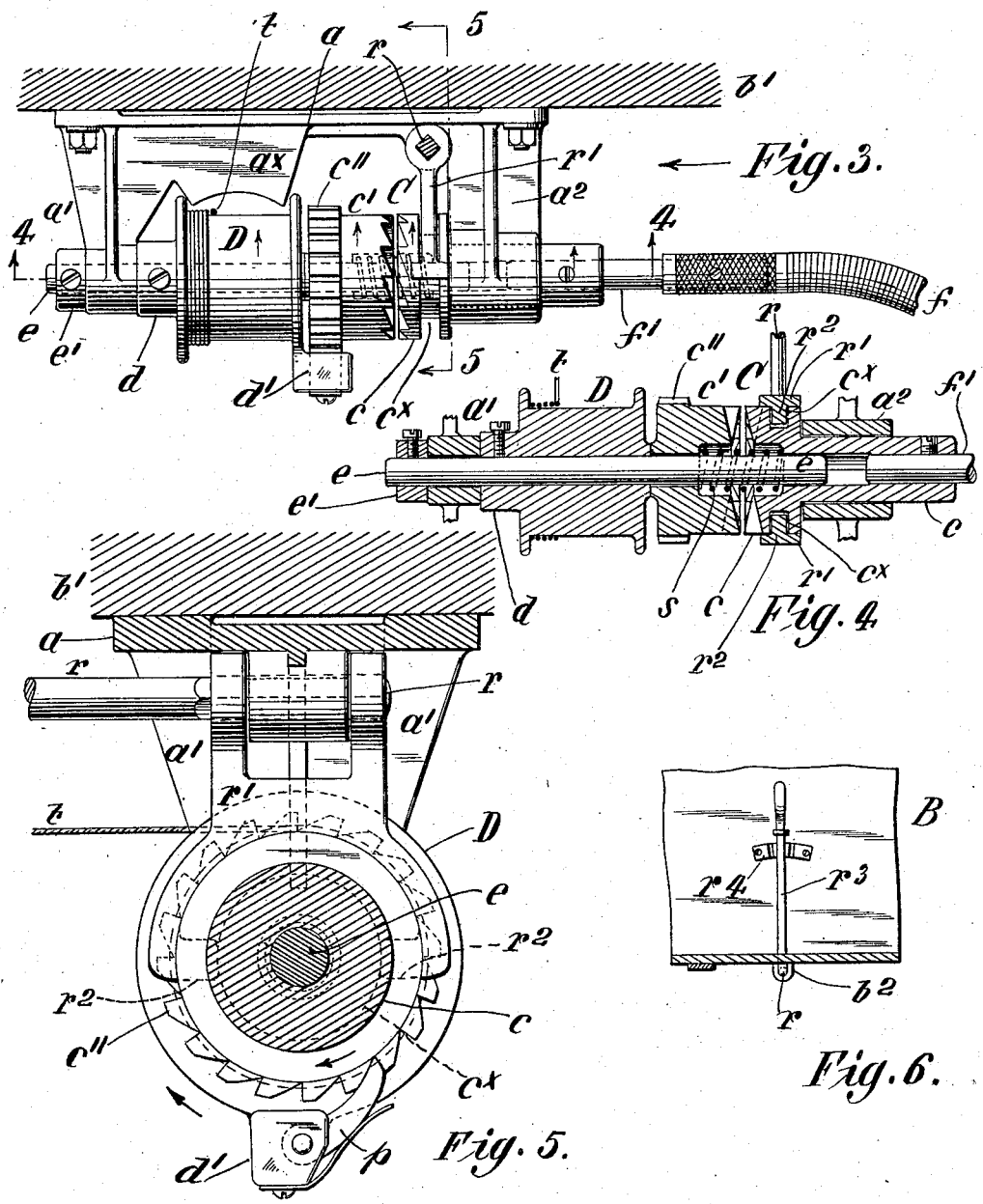

UNITED STATES PATENT OFFICE.

RALPH G. MILLER, OF NEW YORK, N. Y.

ANIMAL-TETHER FOR VEHICLES.

1,187,080.   Specification of Letters Patent.   Patented June 13, 1916.

Application filed August 9, 1915. Serial No. 44,400.

*To all whom it may concern:*

Be it known that I, RALPH G. MILLER, a citizen of the United States, and a resident of the borough of Bronx, county of Bronx, city and State of New York, have invented certain new and useful Improvements in Animal-Tethers for Vehicles, of which the following is a specification.

My improvements relate to tethering devices attached to vehicles and designed primarily to prevent a horse or other draft animal from moving or running away from a prescribed position or location, as set forth in a general way in Letters Patent No. 1,123,568, issued to myself and E. C. Waterhouse, January 5th, 1915.

My present invention is designed to obviate the defective features discovered in the construction and operation of the arrangement of parts disclosed in the aforesaid Letters Patent, and to afford a simple, cheap but substantial, and effective tethering device adapted for convenient attachment to vehicles of various shapes and kinds, and fully meeting the conditions and requirements of general use, as hereinafter more fully set forth.

Figure 1:
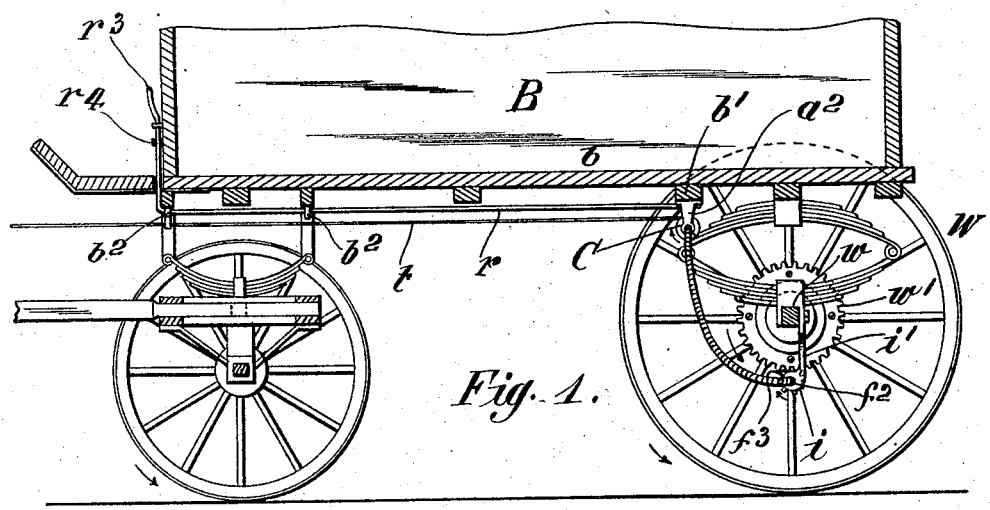
Figure 2:
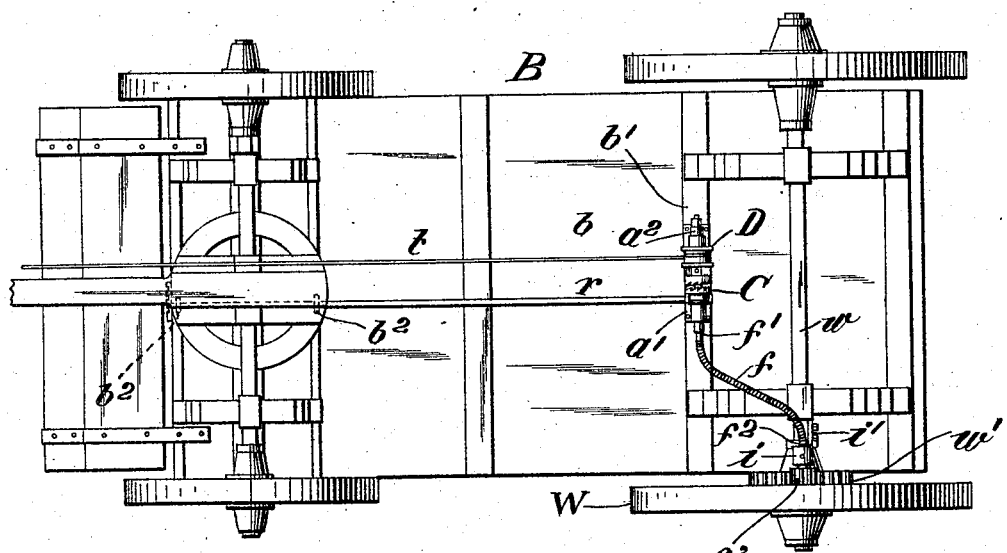

In the accompanying drawings, Figure 1, is a vertical longitudinal section of a road wagon to which my improved tethering mechanism is applied; Fig. 2, a view of the under side of the wagon; Fig. 3, an elevation upon a larger scale of the drum and clutch mechanism; Fig. 4, a central longitudinal sectional elevation of said drum and clutch mechanism; Fig. 5, a transverse section upon a still larger scale taken upon plane of line 5—5, Fig. 3; Fig. 6, a detail showing a form of clutch-controlling lever adapted for use in connection with my improved tethering device.

In said drawings B, represents, for convenience of illustration, the body of an ordinary box wagon to which my improved tethering apparatus is applied, although the latter is applicable to wheeled vehicles of all shapes and descriptions, this being one of its advantages as compared with the construction and arrangement of parts shown in my Letters Patent hereinbefore referred to, which could not be attached to vehicle bodies of certain shapes, or those with underslung axles.

In the present case the drum D, and clutch mechanism C, provided may be attached to any rigid part of the bottom $b$, of the vehicle body, preferably to the under side of a transverse rib or cleat $b'$, as shown in Figs. 1, and 2, the depth of the cleat $b'$, affording suitable clearance for the rock shaft $r$, the tether cord $t$, and other operative parts of the apparatus.

The tether drum D, and clutch C, are mounted upon and between pendent brackets $a'$, $a^2$, preferably made integral with a common base $a$, secured to the cleat $b'$, or other fixed part of the vehicle,—the clutch mechanism C, being of any desired or well known form and construction of parts. Thus, as shown in Figs. 3, 4, and 5, of the drawings the slidable clutch member $c$, is held normally against the bracket bearing $a^2$, by a spring $s$, interposed between it and the other clutch member $c'$, said slidable clutch member $c$, consisting essentially of a sleeve mounted loosely in said bracket bearing $a^2$, into the outer extremity of which sleeve $c$, a solid extension $f'$, of the flexible shaft $f$, is inserted and rigidly secured, as shown in Figs. 3, and 4. One end of the rotatable shaft $e$, also protrudes into the sleeve $c$, to be thus indirectly supported by the aforesaid bracket bearing $a^2$, while the other extremity of said rotatable shaft $e$, is supported in the bracket bearing $a'$, being held thereon against longitudinal movement by the collar $e'$, and the hub $d$, of the drum D, said collar and said hub $d$, being rigidly secured to the rotatable shaft $e$, as clearly indicated in Figs. 3, and 4.

The intermediate or non-sliding clutch member $c'$, is mounted loosely on the shaft $e$, and is pressed against the drum D, by the spring $s$, before referred to, as will be understood by reference to Fig. 4, particularly. This non-slidable clutch member $c'$, is formed with an annular series of ratchet teeth $c''$, for engagement with a spring pawl $p$, pivotally mounted upon an arm $d'$, rigid upon the tether drum D, as clearly shown in Fig. 5. The shifting of the position of the slidable clutch member $c$, is effected by means of the rock arm $r'$, pivotally suspended from the bracket base $a$, the lower part of said rock arm $r'$, being bifurcated and formed with inturned shoulders $r^2$, $r^2$, which protrude into the annular groove $c^x$, in said slidable clutch member $c$, as shown clearly in Fig. 4. This rocker $r'$, is rigidly secured to the inner end of the rock shaft $r$, which extends longitudinally under the bottom $b$, of the vehicle body B, being supported thereon at intervals by suitable bearings $b^2$. The front end of this rock lever $r$, is provided with an actuating lever $r^3$, adapted for manipulation manually, a catch or retaining rack $r^4$, or equivalent device being provided whereby the lever $r^3$, and consequently the rock shaft $r$, and rocker arm $r'$, may be maintained in a prescribed position for the purpose of controlling the slidable clutch member $c$. As shown in the drawings the elasticity and resilience of the manual lever $r^3$, is relied upon to spring said lever in and out of engagement with the notches in the retaining rack $r^4$, but it is obvious that any other mechanical expedient may be employed with like result. That is to say, I do not confine myself to the use of this or any other special form or construction of holding device $r^4$, my invention in this respect contemplating the use in connection with the rock shaft $r$, and the lever $r^3$, by which it is controlled, of any well known device or mechanical expedient for retaining the same in a prescribed position, while admitting of manipulation in the manner set forth.

The other or outer end $f^2$, of the flexible shaft $f$, is journaled in a bearing $i$, formed in the lower part of a suspender bracket $i'$, secured to the rear wheel axle $w$, adjacent to the right hand side wheel in the drawings, although this is not material, as either rear wheel may be utilized to rotate the flexible shaft $f$, as may be found most expedient. A pinion $f^3$, is mounted on the end $f^2$, of the flexible shaft, positioned between the bearing $i$, and the wheel W, and meshes with a gear wheel $w'$, rigidly attached to the latter so that the pinion $f^3$, flexible shaft $f$, and slidable member $c$, of the clutch C, will rotate simultaneously and constantly with the said rear wheel W. The pitch of the wheel gear $w'$, as related to that of the pinion $f^3$, may be as six to one, or of any relative difference in rotative speed that may be found most expedient,—six to one being that shown in the drawings and used herein by way of illustrating and describing the operation of my improved tethering apparatus.

It is to be noted in this connection that whereas in my prior patent hereinbefore referred to frictional engagement between contact pulleys and the hubs of the rear wheels is relied upon to actuate the tether drum, in the present case the connection between the drive wheel W, and the slidable clutch $c$, is positive, thus insuring instantaneous response when the device is set for action, and obviating any danger of slip or inefficiency by reason of the presence of rain, dampness, grease or other extraneous matter between the contacting surfaces of hubs and pulleys,—a serious practical objection to my old form of device which it is a special object of my present invention to obviate.

The operation of my improved tethering appliance is as follows, it being presumed that the tether cord (and by "cord" I mean to designate herein any suitable flexible connection) has been positively connected with bridle or other part of the harness of the draft animal by appropriate means, and that the lever $r^3$, has been set to lock the slidable member $c$, of the clutch in engagement with the non-slidable member $c'$, of said clutch C. Under these conditions if the animal starts forward the rotation of the vehicle wheel W, will cause the rotation of the pinion $f^3$, flexible shaft $f$, and clutch C, in the opposite direction, as indicated by the arrows in Figs. 1, 3, and 5, thereby causing the pawl $p$, by reason of its engagement with any one of the ratchet teeth $c''$, to rotate the tether drum D, in the same direction. The gear wheel $w'$, being, say, six times the diameter of the pinion $f^3$, the tether drum D, will rotate six times for each revolution of the vehicle wheel W, and as one or two revolutions of the drum will under ordinary conditions be sufficient to take up the slack of the tether cord $t$, it is obvious that the check on the draft animal will be effectually initiated during the first revolution of the wagon wheel W, and that any further revolution thereof in the same forward direction will prevent further advance by the animal. Thus if the diameter of the tether drum D, is properly proportioned to that of the vehicle wheel W, it will readily be seen that the animal may be stopped with certainty before it has advanced, say, ten feet, and before any damage can result, whereas in my previous arrangement of contact pulleys, even if the latter did not slip, the animal might travel several times that distance before being checked, because the contact pulleys rotated only once for each revolution of the vehicle rear wheels. Furthermore in my old arrangement if after being checked the draft animal backed up for relief from tension, and continued to back up sufficiently, the drum would wind the tether cord up in the reverse direction, still further complicating a dangerous situation. This I obviate in my present arrangement and construction of parts by mounting the clutch member $c'$, loosely on the shaft $e$, as before set forth, and arranging its ratchet teeth $c''$, so that they positively engage the pawl $p$, in one direction only, as shown clearly in Fig. 5. As a result, when the animal backs up, as soon as the tension on the tether cord relaxes the pawl $p$, slips over the ratchet teeth $c''$, and the drum D, and shaft $e$, become independent of the clutch mechanism C, and remain stationary to all intents and purposes, unless the animal again starts forward, when the positive reëngagement of the pawl *p*, with the ratchet teeth *c''*, will reëstablish the relation and operation of parts hereinbefore described.

It will thus be seen that my present construction and arrangement of operative parts is not only much more simple than the old, but that it is also more effective, being quick and positive in action, and non-reversible in that the tether drum is operative in one direction only, *i. e.*, during the forward rotation of the vehicle wheel by which the slidable clutch member is rotated. Furthermore, owing to its simplicity and compactness of structure, my improved tethering apparatus is readily and conveniently attachable to vehicles of any and all kinds, since the drum and clutch mechanism occupies but little space and may be positioned centrally immediately adjacent to the vehicle body, thus admitting of direct alinement of tether cord, &c., obviating the need of compensating means, and leaving the space between the vehicle body and the ground practically unobstructed. Hence, also, the appearance of the vehicle to which my improved tethering attachment is applied is not materially altered or disfigured.

In order to confine the tether cord *t*, properly to the periphery of the drum D, I prefer to form the bracket base *a*, with a retaining web or flange $a^x$, as shown in Fig. 3.

What I claim as my invention and desire to secure by Letters Patent is,

1. In an animal-tethering vehicle attachment of the character designated, the combination of a tether cord drum and tether, clutch mechanism in axial alinement with said tether drum, means for making and breaking operative connection between said clutch mechanism and said tether drum, a pinion mounted in juxtaposition to one of the vehicle wheels, a flexible shaft connecting said clutch mechanism with said pinion, and a cog wheel rigidly attached to said vehicle wheel and meshing with said pinion, for the purpose described.

2. In an animal-tethering vehicle attachment of the character designated, the combination of a tether cord drum and tether, said drum being provided with a spring pawl, clutch mechanism in axial alinement with said tether drum, the member of said clutch mechanism next to said drum being mounted loosely and being formed with an annular series of ratchet teeth adapted to positively engage in one direction with said spring pawl on the tether drum, means for moving the other, slidable member of the clutch mechanism into and out of engagement with said ratchet-toothed member, a pinion mounted in juxtaposition to one of the wheels of the vehicle, a flexible shaft connecting said slidable member of the clutch member with said pinion, and a cog wheel rigidly attached to said vehicle wheel and meshing with said pinion, for the purpose described.

3. In an animal-tethering vehicle attachment of the character designated, the combination of a tether cord drum and tether, clutch mechanism in axial alinement with said tether drum, lockable means for making and breaking operative connection between said clutch mechanism and said tether drum, a pinion mounted in juxtaposition to one of the vehicle wheels, a flexible shaft connecting said clutch mechanism with said pinion, and a cog wheel rigidly attached to said vehicle wheel and meshing with said pinion.

RALPH G. MILLER.

Witnesses:
MORRIS LEPACHMAN,
GEO. WM. MIATT.

Copies of this patent may be obtained for five cents each, by addressing the "Commissioner of Patents Washington, D. C."